(12) United States Patent
Lee

(10) Patent No.: US 8,952,653 B2
(45) Date of Patent: Feb. 10, 2015

(54) INTELLIGENT ECO-FRIENDLY STARTER BATTERY

(76) Inventor: Chih Hsing Lee, New Taipei (TW)

( * ) Notice: Subject to any disclaimer, the term of this patent is extended or adjusted under 35 U.S.C. 154(b) by 498 days.

(21) Appl. No.: 13/436,096

(22) Filed: Mar. 30, 2012

(65) Prior Publication Data

US 2013/0257388 A1 Oct. 3, 2013

(51) Int. Cl.
*H02J 7/00* (2006.01)

(52) U.S. Cl.
USPC .......................................................... 320/105

(58) Field of Classification Search
USPC .......................... 320/103, 104, 105, 107, 150
See application file for complete search history.

(56) References Cited

U.S. PATENT DOCUMENTS

| | | | | |
|---|---|---|---|---|
| 5,994,669 A | * | 11/1999 | McCall | 219/209 |
| 8,076,900 B1 | * | 12/2011 | Brown | 320/105 |
| 8,610,396 B2 | * | 12/2013 | Hunter et al. | 320/105 |
| 2007/0285049 A1 | * | 12/2007 | Krieger et al. | 320/105 |
| 2013/0171503 A1 | * | 7/2013 | Lee | 429/150 |

* cited by examiner

*Primary Examiner* — Richard V Muralidar
(74) *Attorney, Agent, or Firm* — Rosenberg, Klein & Lee

(57) ABSTRACT

An intelligent eco-friendly starter battery includes pre-heating plates attached to lithium polymer cells thereof, a battery cell sensor module capable of sensing the temperature of the lithium polymer cells and controlling the pre-heating plates to pre-heat the lithium polymer cells to a predetermined temperature, a battery charging control circuit consisting of a plurality of power sensors and a battery charger for sensing the power level of each lithium polymer cell and charging each lithium polymer cell, a protection circuit assembly consisting of a field effect transistor, a relay and a controller for battery over-current and overheat protection, a transmitter receiver circuit and an antenna for transmitting the data sensed by the battery cell sensor module to a remote controller or external display.

2 Claims, 5 Drawing Sheets

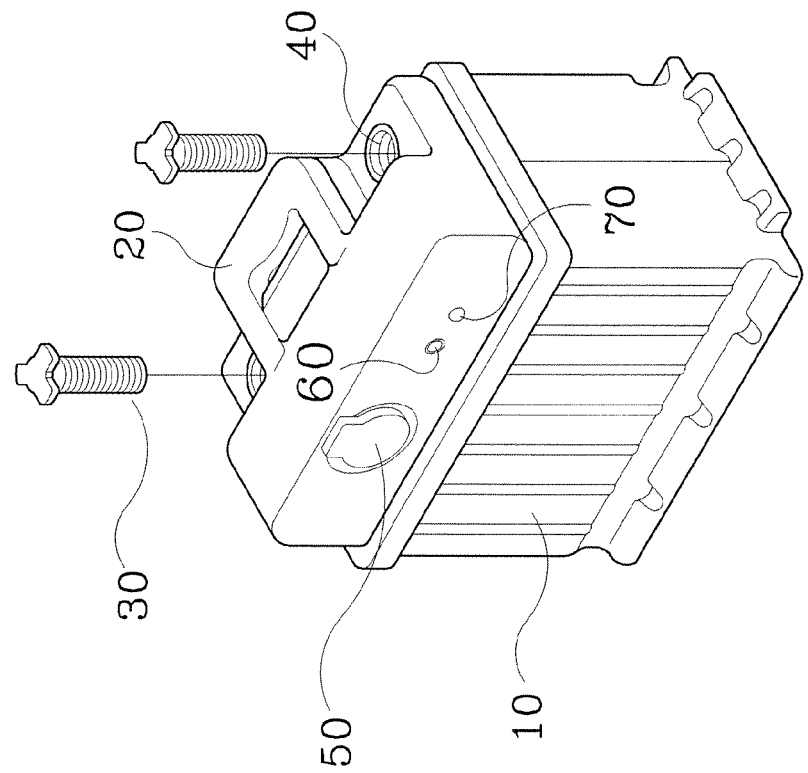
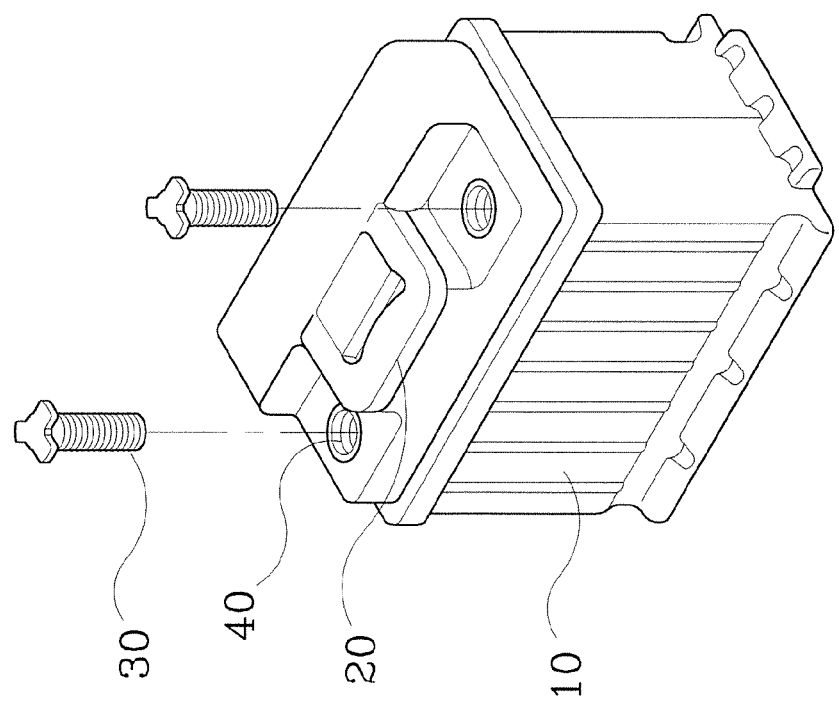

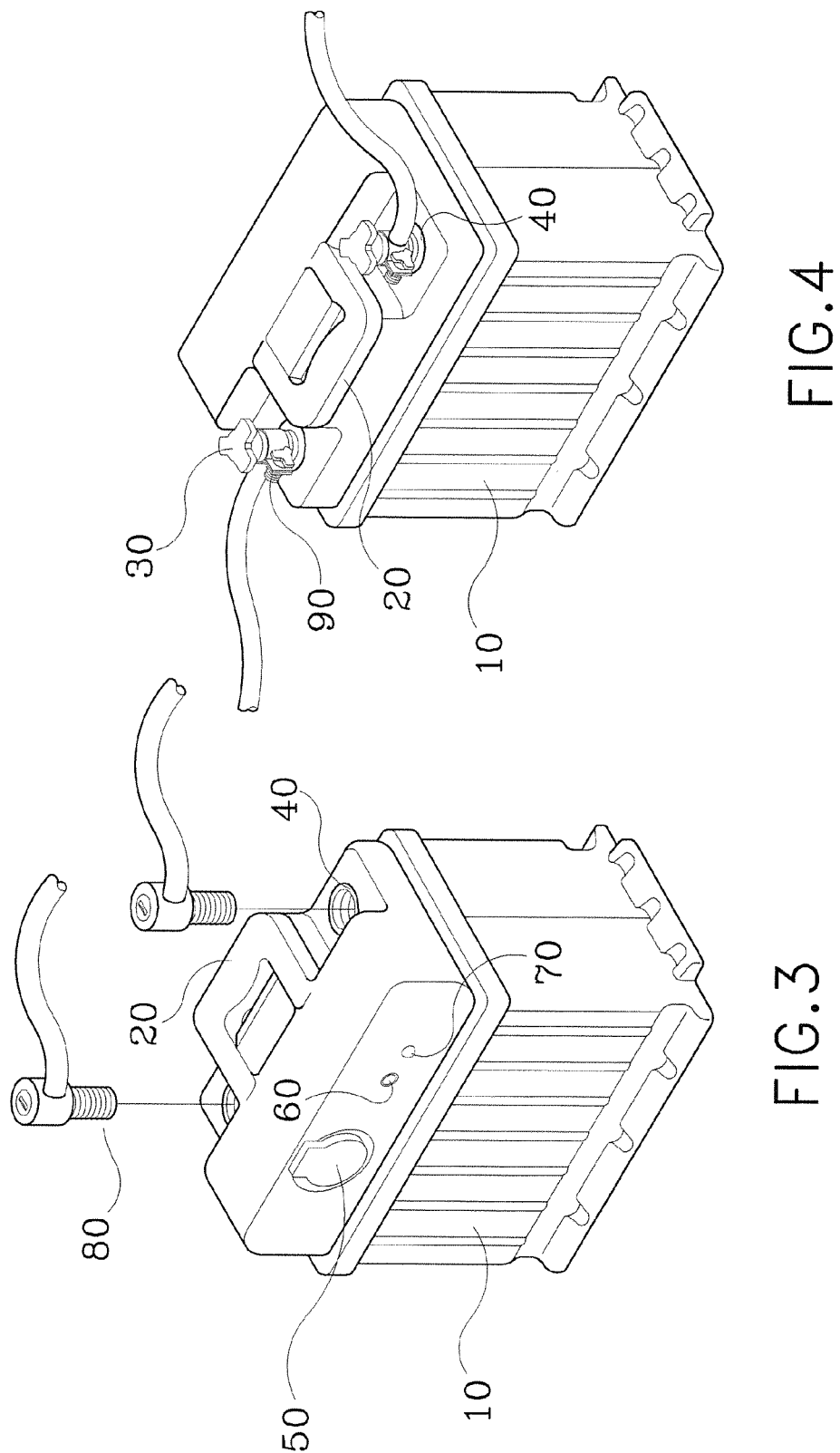

INTELLIGENT ECO-FRIENDLY STARTER BATTERY

BACKGROUND OF THE INVENTION

1. Field of the Invention

The present invention relates to starter batteries for car and more particularly, to an intelligent eco-friendly starter battery, which has the characteristics of high capacity, light weight, long lifespan, environment protection and reduction of the load of the car starter, allows connection to different cars by means of different jumper cables, and can pre-heat the lithium polymer cells therein to a predetermined temperature during a cold weather, automatically charge each lithium polymer cell that is power low, automatically cut off the circuit upon battery over-current or overheat, and transmit the data sensed by a battery cell sensor module thereof to a remote controller or external display wirelessly.

2. Description of the Related Art

Lead-acid batteries are commonly used as starter batteries for car. However, a lead-acid battery has low charging/discharging performance and not allow for reversing output polarity. Further, conventional car starter batteries are not highly stable, and may be suddenly over-consumed, causing the driver unable to start the car and leading to travel delay or traffic impact. Further, conventional car starter batteries simply provides a power inspection function without automatic power-off and balance charging and discharging control functions, leading to battery power attenuation and loss.

Further, conventional car starter batteries are designed for use in specific models of cars. Different models of cars cannot use one same type of starter battery. Further, conventional car starter batteries are not applicable in different geographical areas that exhibit significant temperature differences.

Further conventional lead-acid car starter batteries are neither environmentally friendly nor cable of displaying power capacity, electrical properties and internal battery cell status. Thus, a user may keep using a poor lead-acid car starter that may fail soon.

SUMMARY OF THE INVENTION

The present invention has been accomplished under the circumstances in view. It is the main object of the present invention to provide an intelligent eco-friendly starter battery, which allows connection to different cars by means of different jumper cables, provides a polarity-reversed output control to fit different cars and a standby power supply for emergency starting.

It is another object of the present invention to provide an intelligent eco-friendly starter battery, which has the characteristics of thermostat control, electrical power and voltage measurement and automatic power-off controls, assuring a high level of power-supplying stability.

It is still another object of the present invention to provide an intelligent eco-friendly starter battery, which can pre-heat the lithium polymer cells to a predetermined temperature during a cold weather, automatically charge each lithium polymer cell that is power low, automatically cut off the circuit upon battery over-current or overheat, and transmit the data sensed by a battery cell sensor module thereof to a remote controller or external display wirelessly.

To achieve these and other objects of the present invention, an intelligent eco-friendly starter battery comprises a housing accommodating therein multiple sets of lithium cells, a control circuit assembly for polarity-reversed output control, thermostat control, electrical power and voltage measurement and automatic power-off control, carrying-handle located on the top side of the top cover of the housing, two conducting screw holes located on the top cover at two opposite sides relative to the carrying-handle and electrically connected with the lithium polymer cells for the connection of a jumper cable with conducting screw terminals, a charging-discharging copper screw detachably threaded into each of the two conducting screw holes for the connection of a jumper cable with conducting terminal clamps, a power switch for switching on/off a standby power supply provided by the lithium cells, an indicator light for indicating on/off status of the power switch, a battery, a plurality of pre-heating plates attached to the lithium polymer cells, a battery cell sensor module capable of sensing the temperature of the lithium polymer cells and controlling the pre-heating plates to pre-heat the lithium polymer cells when the temperature of the lithium polymer cells drops below a predetermined low level, a battery charging control circuit consisting of a plurality of power sensors and a battery charger for sensing the power level of each lithium polymer cell and charging each lithium polymer cell, a protection circuit assembly consisting of a field effect transistor, a relay and a controller for battery over-current and overheat protection, a transmitter receiver circuit and an antenna electrically connected to the battery cell sensor module and the controller for transmitting the data sensed by the battery cell sensor module to a remote controller or display means.

BRIEF DESCRIPTION OF THE DRAWINGS

FIG. 1 is an exploded view of an intelligent eco-friendly starter battery in accordance with the present invention.

FIG. 2 corresponds to FIG. 1 when viewed from another angle.

FIG. 3 illustrates one application example of the intelligent eco-friendly starter battery in accordance with the present invention.

FIG. 4 illustrates another application example of the intelligent eco-friendly starter battery in accordance with the present invention.

DETAILED DESCRIPTION OF THE PREFERRED EMBODIMENT

Figure 5:
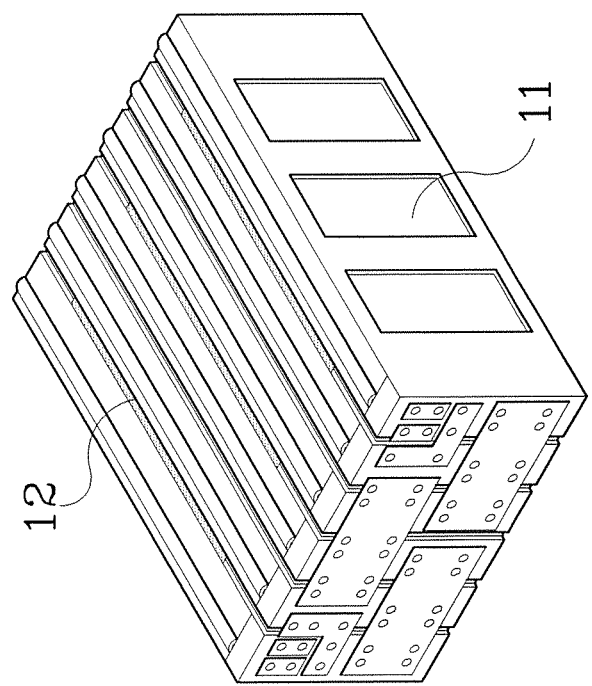
FIG. 5 is an elevational view of a part of the present invention, illustrating the pre-heating plates attached to the lithium polymer cells of the intelligent eco-friendly starter battery.

Referring to FIGS. 1 and 2, an intelligent eco-friendly starter battery in accordance with the present invention is shown. As illustrated, the intelligent eco-friendly starter battery comprises a housing 10, and multiple lithium polymer cells 11 (see FIG. 5) set in the housing 10 and connected in series. The intelligent eco-friendly starter battery has the characteristics of high capacity, light weight, long lifespan, environment protection and reduction of the load L of the car engine (see FIG. 9).

The power supply of the series lithium polymer cells 11 is majorly adapted for starting the car under a normal condition, and partially used as standby power supply for emergency starting. The intelligent eco-friendly starter battery has built therein a control circuit assembly for polarity-reversed output control, thermostat control, electrical power and voltage measurement and automatic power-off control.

The intelligent eco-friendly starter battery further comprises a carrying-handle 20 located on the top side of the top cover of the housing 10, and two conducting screw holes 40 located on the top cover of the housing 10 at two opposite sides relative to the carrying-handle 20 and electrically connected with the series of lithium polymer cells 11 in the housing 10. The polarity of the conducting screw holes 40 can be adjusted to fit different models of cars.

Further, a charging-discharging copper screw 30 is detachably threaded into each of the conducting screw holes 40 for the connection of any of a variety of jumper cables for different cars.

Figure 7:
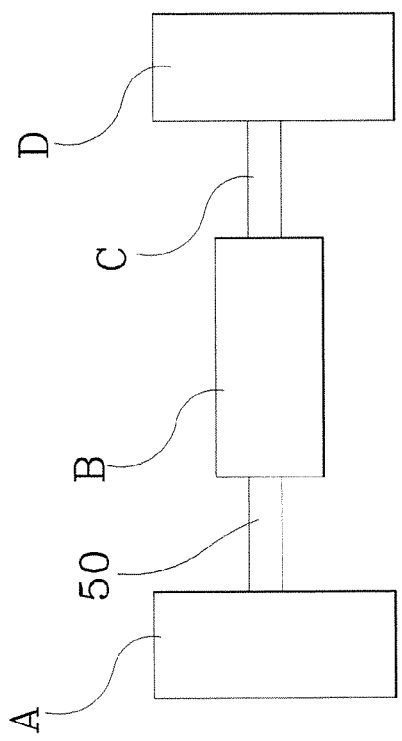
FIG. 7 is a block diagram of the present invention, illustrating the intelligent eco-friendly starter battery connected to a computer through a USB bus and a network device.

The intelligent eco-friendly starter battery further comprises an interface port 50, a power switch 60 and an indicator light 70 located on the back side of the top cover of the housing 10 (see FIG. 2). The interface port 50 is adapted for the connection of a computer D by a USB bus C and a network device B for electrical power and voltage measurement and cell failure inspection, facilitating repair and replacement of any individual lithium cell 11 of the intelligent eco-friendly starter battery A (see FIG. 7). The production personnel can calibrate the voltage, current and capacity of the lithium polymer cells 11 of the intelligent eco-friendly starter battery A, and set the optimal parameters for the variable electrical properties of the lithium polymer cells 11. Further, the production personnel can also install the manufacturing date and the product ID number in the intelligent eco-friendly starter battery A through the interface port 50. In future, an inspector can read the voltage, current and capacity data of the intelligent eco-friendly starter battery A by means of the interface port 50 and a specific network device B and a computer D for accurate calibration. Further, the user can simply review the inspected data but is not allowed for making a calibration. Calibration must be performed by a professional maintenance mechanic or engineer.

The power switch 60 is adapted for switching on/off standby power supply for starting the car under an emergency condition. The indicator light 70 is adapted for indicating the on/off status of the standby power supply (the power switch 60).

The aforesaid thermostat control (see FIG. 5) comprises a plurality of pre-heating plates 12 attached to the lithium polymer cells 11 of the intelligent eco-friendly starter battery A, and a battery cell sensor module G1 (see FIG. 9) capable of sensing the temperature of the lithium polymer cells 11 and controlling the pre-heating plates 12 to pre-heat the lithium polymer cells 11 when the temperature of the lithium polymer cells 11 drops below a predetermined low level. When the intelligent eco-friendly starter battery A is used during cold weather or in freezing areas, the battery cell sensor module G1 can control the pre-heating plates 12 to pre-heat the lithium polymer cells 11, keeping the lithium polymer cells 11 at room temperature.

FIG. 3 illustrates an application example of the present invention. As illustrated, after removal of the charging-discharging copper screws 30 from the conducting screw holes 40 of the intelligent eco-friendly starter battery, two conducting screw terminals 80 of a jumper cable are respectively connected to the conducting screw holes 40 of the intelligent eco-friendly starter battery A for power transmission. FIG. 4 illustrates another application example of the present invention. As illustrated, two conducting terminal clamps 90 of a jumper cable are respectively fastened to the charging-discharging copper screws 30 in the conducting screw holes 40 of the intelligent eco-friendly starter battery A for power transmission. Thus, the intelligent eco-friendly starter battery A can be selectively with different jumper cables in different models of cars.

Figure 8:
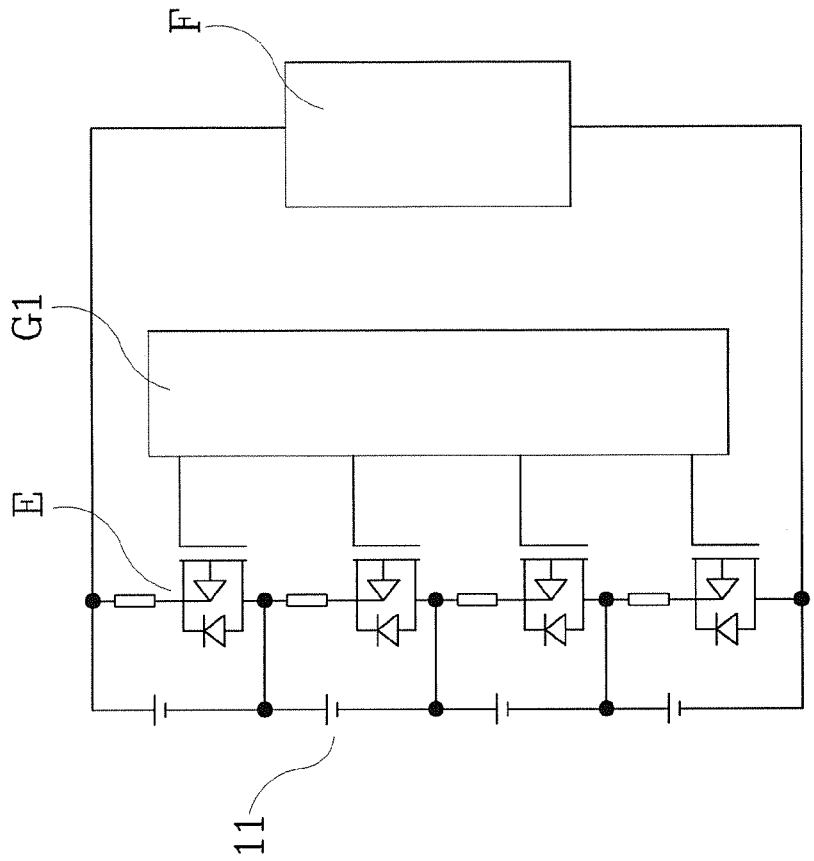
FIG. 8 is a system block diagram of battery charging control circuit of the intelligent eco-friendly starter battery in accordance with the present invention.

Referring to FIG. 8, the intelligent eco-friendly starter battery A further comprises a battery charging control circuit, which comprises a plurality of power sensors E for sensing the power level of each of the lithium polymer cells 11, and a battery charger F for charging each of the lithium polymer cells 11. Thus, the lithium polymer cells 11 can be automatically charged, keeping in equilibrium to achieve maximum power supplying efficiency.

Figure 9:
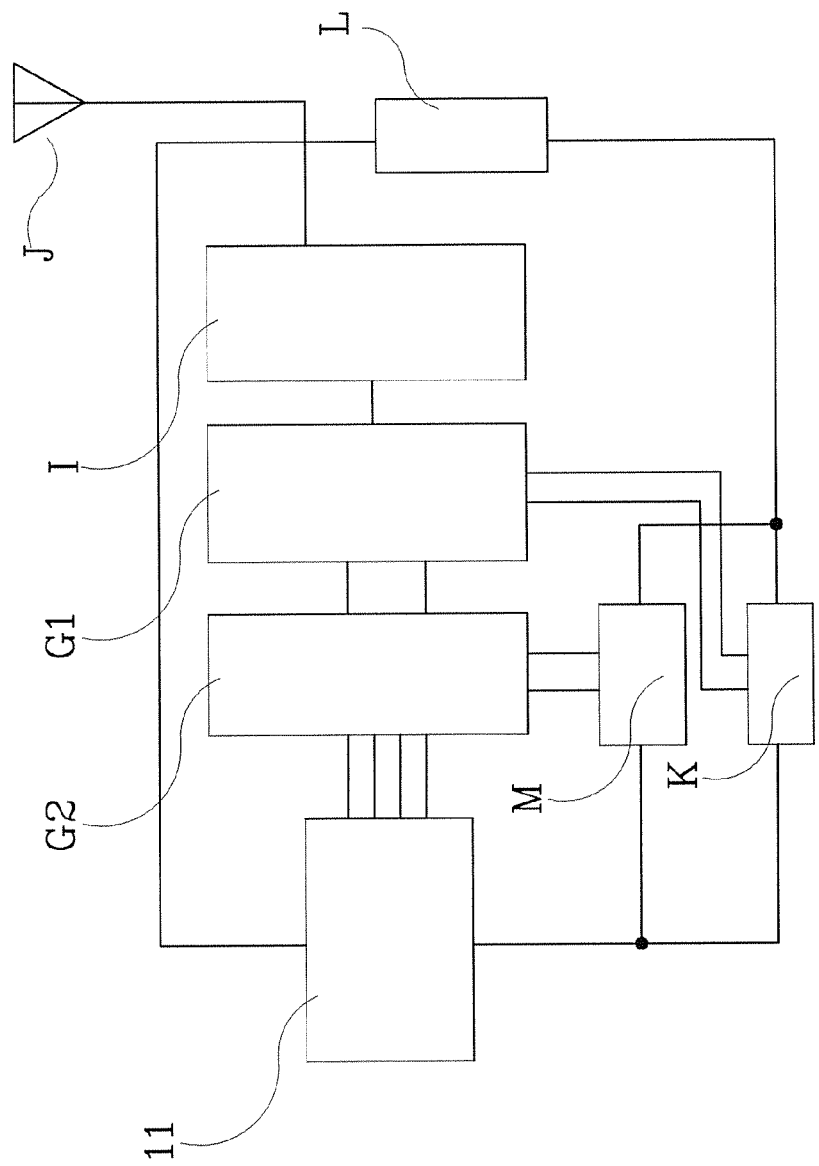
FIG. 9 is a system block diagram of the protection circuit assembly of the intelligent eco-friendly starter battery in accordance with the present invention.

Referring to FIG. 9, the intelligent eco-friendly starter battery A further comprises a protection circuit assembly to provide a double protection effect. The protection circuit assembly comprises a field effect transistor M, a relay K and a controller G2 respectively electrically coupled with the battery cell sensor module G1. When an over-current or over-heat occurs due to overcharging or over-discharging, the controller G2 controls the relay K to open the circuit, avoiding damaging the lithium polymer cells 11.

Figure 6:
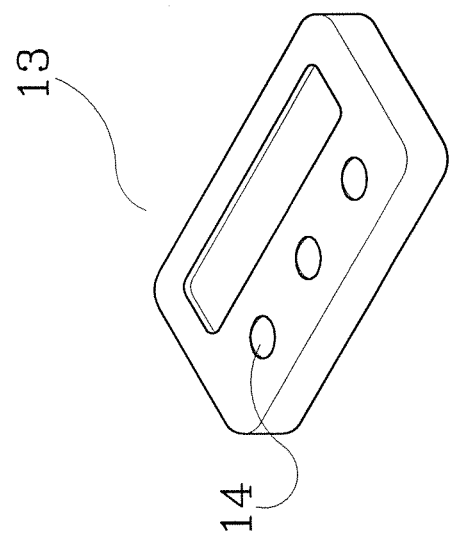
FIG. 6 is an elevational view of a remote controller for use with the intelligent eco-friendly starter battery in accordance with the present invention.

Referring to FIG. 9 again, the intelligent eco-friendly starter battery A further comprises a transmitter receiver circuit I and an antenna J electrically connected to the battery cell sensor module G1 and the controller G2. All the data sensed by the battery cell sensor module G1 can be transmitted by the transmitter receiver circuit I through the antenna J to a remote controller 13 (see FIG. 6).

As stated above, all the data (current, voltage and power capacity) sensed by the battery cell sensor module G1 can be transmitted a computer D (or monitor) by a USB bus C and a network device B, or alternatively, by a wireless manner, i.e., by the transmitter receiver circuit I through the antenna J to the remote controller 13. The remote controller 13 comprises three operating buttons 14. The first operating button 14 is adapted for pre-heating control. The second operating button 14 is adapted for controlling battery power output or pre-starting power output. The third operating button 14 is adapted for reading the data sensed by the battery cell sensor module G1.

Further, the manufacturing date and product ID number of the intelligent eco-friendly starter battery A can also be displayed on the linked computer D (or monitor) or the remote controller 13 so that the computer D (or monitor) or the remote controller 13 can be used as a warranty.

Although a particular embodiment of the invention has been described in detail for purposes of illustration, various modifications and enhancements may be made without departing from the spirit and scope of the invention. Accordingly, the invention is not to be limited except as by the appended claims.

What the invention claimed is:

1. An intelligent eco-friendly starter battery, comprising a housing accommodating therein multiple sets of lithium cells, said housing comprising a top cover, a carrying-handle located on a top side of said top cover of said housing, two conducting screw holes located on said top cover at two opposite sides relative to said carrying-handle and electrically connected with said multiple sets of lithium polymer cells, a charging-discharging copper screw detachably threaded into each of said two conducting screw holes, an interface port for the connection of a computer to measure the electrical power and voltage of said lithium cells and to examine normal functioning of said lithium cells, a power switch for switching on/off a standby power supply provided by said lithium cells, an indicator light for indicating on/off status of said power switch, a battery, a plurality of pre-heating plates attached to said lithium polymer cells, a battery cell sensor module capable of sensing the temperature of said lithium polymer cells and controlling said pre-heating plates to pre-heat said lithium polymer cells when the temperature of said lithium polymer cells drops below a predetermined low level, a battery charging control circuit consisting of a plurality of power sensors and a battery charger for sensing the power level of each said lithium polymer cell and charging each said lithium polymer cell, a protection circuit assembly consisting of a field effect transistor, a relay and a controller for battery over-current and overheat protection, a transmitter receiver circuit and an antenna electrically connected to said battery cell sensor module and said controller for transmitting the data sensed by said battery cell sensor module to a remote controller.

2. The intelligent eco-friendly starter battery as claimed in claim 1, wherein said battery cell sensor module is electrically connectable to an external computer/display means by a USB bus and a network device.

\* \* \* \* \*